(12) United States Patent
Thoreson et al.

(10) Patent No.: US 7,159,486 B2
(45) Date of Patent: Jan. 9, 2007

(54) JOINT ARRANGEMENT FOR A GEAR SHIFT MECHANISM

(75) Inventors: Torsten Thoreson, Ytterby (SE); Marian Gruia, Partille (SE)

(73) Assignee: Volvo Lastvagner AB, Gothenburg (SE)

( * ) Notice: Subject to any disclaimer, the term of this patent is extended or adjusted under 35 U.S.C. 154(b) by 495 days.

(21) Appl. No.: 10/471,007

(22) PCT Filed: Mar. 4, 2002

(86) PCT No.: PCT/SE02/00369

§ 371 (c)(1),
(2), (4) Date: Sep. 8, 2003

(87) PCT Pub. No.: WO02/070297

PCT Pub. Date: Sep. 12, 2002

(65) Prior Publication Data
US 2004/0074329 A1    Apr. 22, 2004

(30) Foreign Application Priority Data
Mar. 7, 2001    (SE) .................................. 0100760

(51) Int. Cl.
B60K 20/00    (2006.01)
(52) U.S. Cl. ................................ 74/473.35; 74/473.34

(58) Field of Classification Search ............... 74/473.1, 74/473.3, 473.34, 473.35
See application file for complete search history.

(56) References Cited

U.S. PATENT DOCUMENTS

| | | | | |
|---|---|---|---|---|
| 3,988,558 A | * | 10/1976 | Josemans et al. | 200/335 |
| 4,324,501 A | * | 4/1982 | Herbenar | 403/133 |
| 4,524,633 A | | 6/1985 | Murata et al. | |
| 4,669,329 A | * | 6/1987 | Suzuki | 74/473.15 |
| 4,711,135 A | | 12/1987 | Horiuchi et al. | |
| 4,916,966 A | * | 4/1990 | Weishaupt et al. | 74/473.29 |
| 5,313,853 A | * | 5/1994 | Olmsted et al. | 74/473.34 |
| 5,907,975 A | * | 6/1999 | Giaimo | 74/473.34 |

FOREIGN PATENT DOCUMENTS

| | | |
|---|---|---|
| DE | 19541709 | 5/1996 |
| EP | 0137253 | 4/1985 |

* cited by examiner

Primary Examiner—David M. Fenstermacher
(74) Attorney, Agent, or Firm—Young & Thompson

(57) ABSTRACT

A joint arrangement in a shift mechanism for a motor vehicle includes a coupling element cooperating with a gear shift lever, a mounting element joinable to a gear lever carrier, and a damping element arranged between the coupling element and the mounting element. The damping element includes cooperating first and second slide surfaces, which, by a relative movement, damp vibrations and substantially prevent vibrations from being transmitted between the mounting element and the coupling element.

14 Claims, 2 Drawing Sheets

JOINT ARRANGEMENT FOR A GEAR SHIFT MECHANISM

BACKGROUND OF THE INVENTION

The present invention relates to a joint arrangement for a gear shift mechanism for a motor vehicle, comprising a coupling element cooperating with a gear shift lever, a mounting element joinable to a gear lever carrier and a damping element arranged between the coupling element and the mounting element.

The joint arrangement in a motor vehicle gear shift mechanism transmits movements of the shift lever to the vehicle gearbox when different gear speeds are to be selected. Between the joint arrangement 1 and the gearbox, rods or wires can transmit the movements of the gear shift lever.

In some types of vehicles, in particular trucks, the joint arrangement is mounted in a gear lever carrier, which is mounted directly on the vehicle engine. Since the engine vibrates, these vibrations are transmitted to the gear shift lever via the gear shift lever via the gear lever carrier and the joint arrangement. The driver can experience these vibrations in the shift lever as irritating and distracting.

It is known previously to provide a gear shift mechanism with a damping element in the form of a rubber element arranged between the joint arrangement of the gear shift mechanism and a mounting. Such damping elements are shown in U.S. Pat. No. 4,524,633 and EP-A-2 137 253, for example. It is also known previously to provide a joint arrangement with a rubber element arranged between a bearing housing for a ball joint and a mounting element arranged about the bearing housing. Such a known joint arrangement is described in more detail in connection with FIG. 1 below. These known damping elements damp the vibrations in the gear shift lever to a certain degree, which is dependent on the hardness of the rubber. To obtain good damping of low amplitude, high frequency vibrations, the rubber element 5 must be made with a very soft rubber mixture, which results in indistinct positions of the shift lever and that certain gear speed positions can be difficult to reach.

Certain types of trucks are provided with a tippable cab. Usually, the engine is placed under the cab, covered by a hood situated between the seats. For tipping, the gear shift lever must be released from the joint arrangement, which remains on the gear lever carrier. The gear shift lever moves with the cab as it is tipped forward. The joint arrangement is provided with a coupling element, which makes it possible to release the gear shift lever from the joint arrangement. Such a joint arrangement adapted to tippable cabs must be made with relatively small dimensions due to space considerations. The damping element in the joint arrangement must also be made with relatively small dimensions.

SUMMARY OF THE INVENTION

The purpose of the present invention is to achieve a joint arrangement in a motor vehicle gear shift mechanism, which damps vibrations and substantially prevents the transmission of vibrations to the gear shift lever.

An additional purpose of the present invention is to achieve a joint arrangement, which damps vibrations of low amplitude and high frequency.

A further purpose of the present invention is to achieve a joint arrangement, which damps vibrations and which is adapted to a separable gear shift mechanism, such as in tippable truck cabs.

This is achieved according to the invention by a joint arrangement of the type described by way of introduction, where the damping element comprises cooperating first and second slide surfaces which, by a relative movement, damp vibrations and substantially prevent vibrations from being transmitted between the mounting element and the coupling element.

The joint arrangement according to the present invention allows the coupling element to slide freely in relation to the mounting element, due to the mass inertia of the coupling element and the gear shift lever cooperating therewith, the vibrations from the engine transmitted to the mounting element will be substantially prevented from being transferred to the coupling element and to the gear shift lever. The coupling element and the gear shift lever will remain essentially stationary or only move slightly, while the mounting element vibrates. The vibrations, which are cancelled by the interacting first and second slide surfaces, are of small amplitude and high frequency. According to one embodiment of the invention, the damping element comprises a rubber element, which is at least partially encapsulated in a cover, comprising said first slide surfaces, said cover consisting of two sheet metal elements, at least partially surrounding the rubber element. The rubber element will absorb vibrations of greater amplitude and lower frequency than the vibrations which are taken up by the slide surfaces between the coupling element and the mounting element. The rubber element also damps forces acting on the mounting element from the gear shift lever when it is used for shifting between various gear speeds. The cover, consisting of two sheet metal elements, forms a unit together with the rubber element.

According to an additional embodiment of the invention, the damping element comprises a rubber element with sheet metal washers vulcanized onto the rubber element, said sheet metal washers constituting said first slide surfaces. According to this embodiment, the sheet metal washers do not need to be dimensioned to interact with each other in the same manner as the sheet metal elements above. The manufacture of the sheet metal washers, however, requires less machining than the sheet metal elements.

BRIEF DESCRIPTION OF THE DRAWINGS

The invention will be explained in more detail below with reference to embodiments shown in the accompanying drawings, of which

DETAILED DESCRIPTION OF THE PREFERRED EMBODIMENTS

Figure 1:
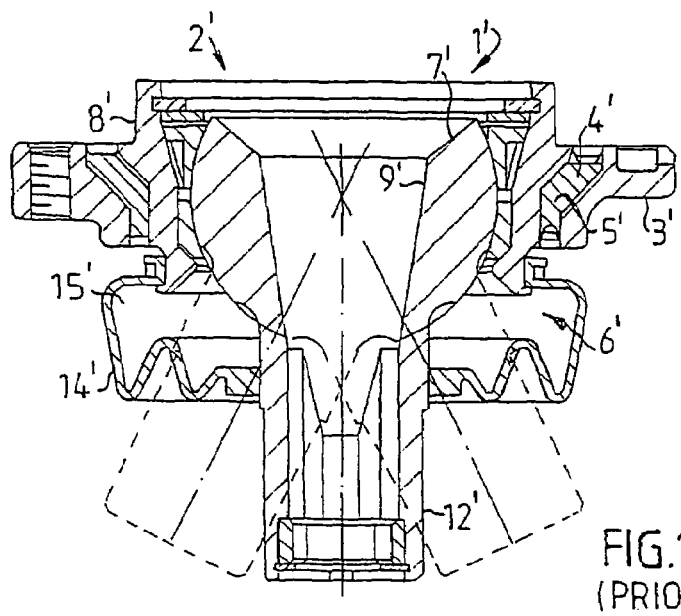
FIG. 1 shows a section through a joint arrangement according to the prior art.

FIG. 1 shows a sectional view of a joint arrangement 1' according to the prior art, comprising a coupling element 2' and a mounting element 3' as well as a damping element 4' arranged between the coupling element 2' and the mounting element 3'. The damping element 4' consists of an annular rubber element 5', which is joined to the couping element 2' and to the mounting element 3', so that the coupling element 2' can be displaced in all directions relative to the mounting element 3'. In the known joint arrangement 1', the coupling element 2' is a ball and socket joint 6', comprising a ball 7' and a bearing housing 8' at least partially surrounding the ball 7'. The ball 7' is provided with a hollowed out portion 9' which is disposed to receive one end of a gear shift lever (not shown in FIG. 1). A pin 12' is arranged at the lower portion of the ball 7'. The pin 12' is coupled to a link mechanism (not shown) which transmits movement from the shift lever to the vehicle gearbox. The joint arrangement 1' is also provided with a rubber gaiter 14', which encloses a space 15' filled with lubricant, such as grease.

Vibrations acting on the mounting element 3' must be damped by the rubber element 5' so as not to be transmitted to the coupling element 2'. As was explained above, the rubber element 5' in the known joint arrangement 1' does not damp the vibrations satisfactorily.

Figure 2:
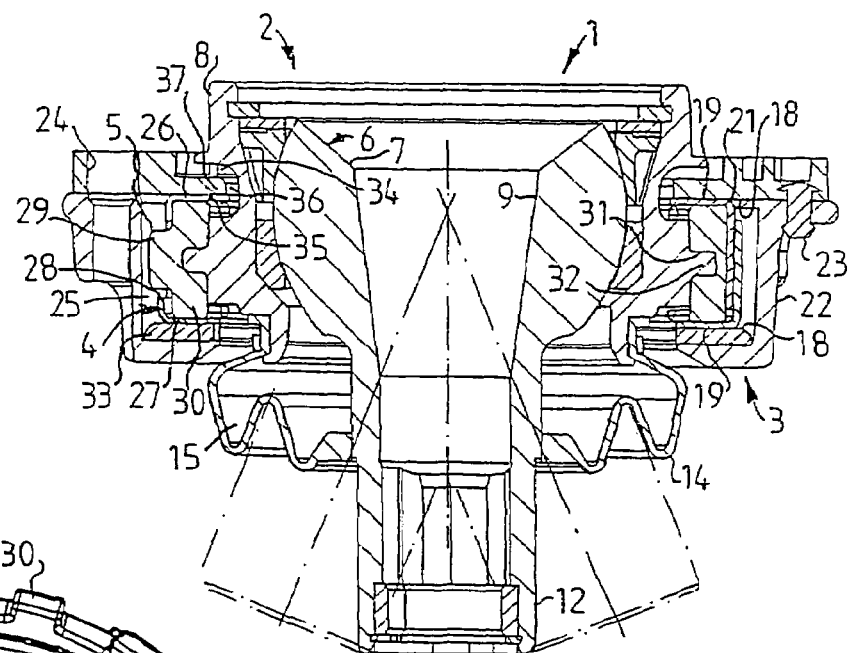
FIG. 2 shows a sectional view through a joint arrangement according to a first embodiment of the present invention.

In order to solve said problem, according to the present invention there is suggested a joint arrangement 1, described below as first and second embodiments. FIG. 2 shows a sectional view of a joint arrangement 1 according to a first embodiment of the present invention, and FIG. 3 shows a gear shift mechanism according to the present invention in which a joint arrangement 1 is included.

Figure 3:
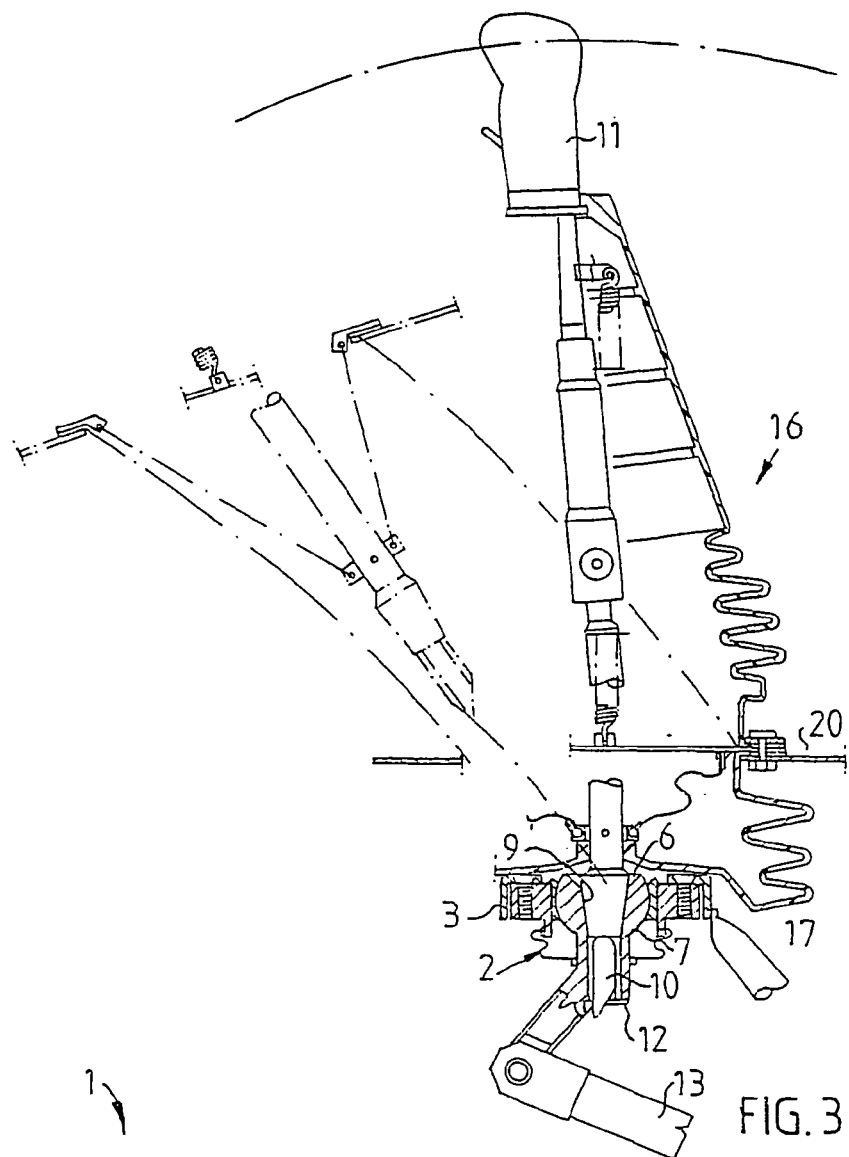
FIG. 3 shows a gear shift mechanism according to the present invention.

FIG. 3 shows the joint arrangement 1 only schematically. The joint arrangement 1 is a portion of a gear shift mechanism 16 for a motor vehicle and comprises a coupling element 2 cooperating with a gear lever 11, a mounting element 3 connectable to a gear lever carrier 17, and a damping element 4 arranged between the coupling element 2 and the mounting element 3. The damping element 4 comprises cooperating first and second slide surfaces 18, 19 which, by a relative movement, damp vibrations and substantially prevent vibrations from being transmitted between the mounting element 3 and the coupling element 2.

The vibrations acting on the joint arrangement 1 arise due to the fact that the gear lever carrier 17 is mounted directly on the vehicle engine, which vibrates during operation. Since the mounting element 3 is joined to the gear lever carrier 17, the vibrations will be propagated from the gear lever carrier 17 to the mounting element 3. The purpose of the damping element 4 is to damp the vibrations so that they are not transmitted to the gear shift lever 11.

Vibrations of high frequency and low amplitude will be damped and substantially smoothed out by the cooperating first and second slide surfaces 18, 19 of the damping element 4. In order to damp and substantially cancel vibrations of low frequency and high amplitude, the damping element 4 has a rubber element 5 arranged between the mounting element 3 and the coupling element 2.

The rubber element 5 is joined to the coupling element 2 in such a manner that the coupling element 2 is displaceable in all directions relative to the mounting element 3. Thus, the coupling element 2 can be displaced both vertically and horizontally relative to the mounting element 3, but also in all other conceivable directions. The coupling element 2 is a ball and socket joint 6, comprising a ball 7 and a bearing housing 8 at least partially surrounding it. The rubber element 5 is joined to the bearing housing 8 at least partially surrounding the ball 7. The ball 7 is provided with a cavity 9, which is disposed to receive an end 10 of the gear lever 11. The gear shift mechanism 16 shown in FIG. 3 is arranged in a truck, which is provided with a tippable cab 20. During tipping, the gear shift lever 11 is released from the joint arrangement 1, which remains on the gear lever carrier 17, as is shown by the dash-dot lines in FIG. 3. The gear shift lever 11 thus goes with the cab 20 when it is tipped. The coupling element 2 thereby makes possible disengagement of the gear shift lever 11 from the joint arrangement 1. A pin 12 is disposed at the lower portion of the ball 7. The pin 12 is disposed to be coupled together with a link mechanism 13, which transmits movement from the shift lever 11 to the vehicle gearbox. The joint arrangement 1 is also provided with a rubber gaiter 14 to enclose a space 15 to be filled with lubricant, such as grease.

The mounting element 3 comprises an upper portion 21 and a lower portion 22, which are held together by one or more rivets 23. The upper and lower portions 21 and 22 are also provided with through-holes for receiving one or more fasteners, such as screws (not shown) for mounting on the gear lever carrier. The upper and lower portions 21, 22 define an annular space 25 for housing the rubber element 5.

Figure 4:
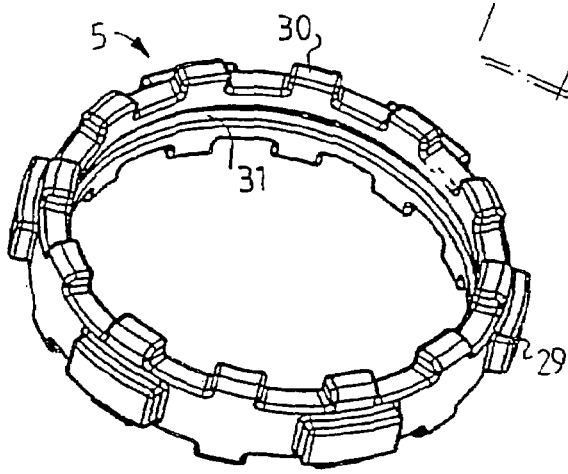
FIG. 4 shows a perspective view of a rubber element according to the present invention.

In the embodiment shown in FIG. 2, the rubber element 5 is annular and partially encapsulated in a cover consisting of first and second sheet metal elements 26, 27, which at least partially surround the rubber element 5. The sheet metal elements 26, 27 are annular and have diameters such that the first sheet metal element 26 can be grip-fitted into the second sheet metal element 27. The sheet metal elements 26, 27 have holes 28 in a peripheral surface, through which there can extend rubber projections 29 on the periphery of the rubber element 5. The rubber element 5 also has a plurality of rubber heels, which abut against the sheet metal elements 26, 27 and a circumferential groove 31 to receive a circumferential flange 32 on the bearing housing 8. Such a rubber element 5 according to the invention is shown in perspective in FIG. 4.

The sheet metal elements 26, 27 have surfaces facing away from the rubber element 5 and these are the first slide surfaces 18 of the damping element 4. The first slide surface 18 of the first sheet metal element 26 is in contact with the mounting element upper portion 21, comprising one of the second slide surfaces 19 of the damp element 4. Preferably, the upper portion of the mounting element 3 is made of a material having a low coefficient of friction, such as plastics of POM type. The first slide surface 18 of the second sheet metal element 27 lies in contact with a washer 33 of a low friction material, such as plastics of POM type. This washer 33 is disposed between the second sheet metal element 27 and the lower portion 22 of the mounting element 3.

By designing the annular space 25 defined by the upper and lower portions 21, 22 of the mounting element 3 to have an outer diameter which is greater than the outer diameter of the rubber element 5, it is made possible for the rubber element 5, the sheet metal elements 26, 27 and the coupling element 2 to be slideably displaced in a plane in relation to the mounting element 3. Due to the mass inertia of the coupling element 2 and the shift lever 11 cooperating therewith, vibrations from the vehicle engine transmitted to the mounting element 3 will be prevented from being transmitted to the coupling element 2 and to the gear shift lever 11. The coupling element 2 and the shift lever 11 will stand essentially still or only move marginally while the mounting element 3 vibrates.

With reference to FIG. 2, a horizontal sliding movement will be limited by the rubber projections 29 of the rubber element 5 striking the lower portion of the mounting element 3. A marginal additional horizontal movement will be permitted, however, by the resilience of the rubber projections 29. A vertical movement, which is permitted by the resilience of the rubber element 5 is limited by first and second plays 34, 35 between a cavity 36 in the bearing housing 8 of the coupling element 2 and a portion 37 of the upper portion of the mounting element 3, said cavity extending into the bearing housing cavity. When said portion 37 of the upper portion 21 strikes the bearing housing 8, the vertical or horizontal movement stops. The cavity 36 and the portion 37 thus form a mechanical stop, which limits the relative movement between the coupling element 2 and the mounting element 3.

Figure 5:
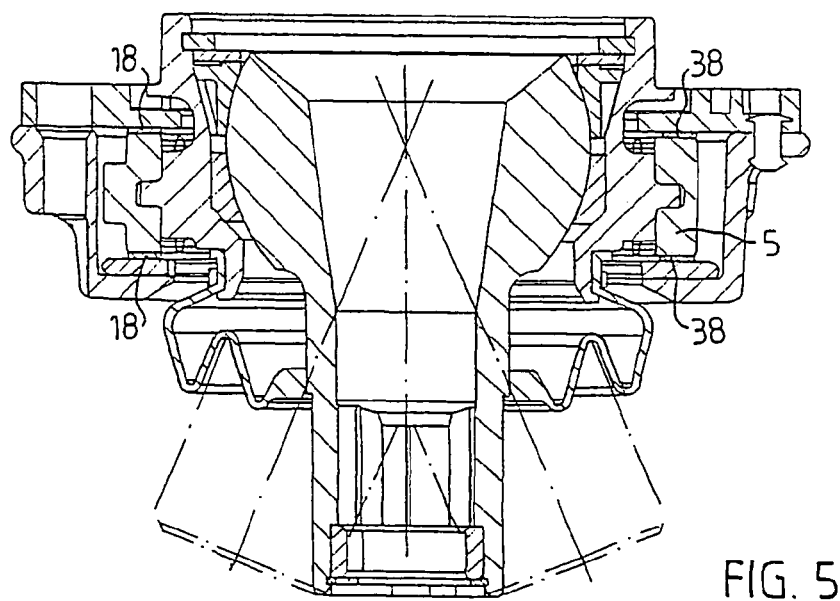
FIG. 5 shows a sectional view of a joint arrangement according to a second embodiment of the present invention.

FIG. 5 shows a sectional view of a joint arrangement according to a second embodiment of the present invention. This second embodiment differs from the first embodiment in that the first slide surfaces 18 are sheet metal washers 38 fused to the rubber element 5.

The sheet metal elements 26, 27 and the sheet metal washers 38 can be manufactured in another material than sheet metal, e.g. plastics. The two sheet metal elements 26, 27 can be made in one piece, which is bent about the rubber element 5. Instead of having a plastic washer 33 between the first and second slide surfaces 18, 19, the second slide surface 19 can be arranged directly on the lower portion 22 of the mounting element 3. It is also possible to place a plastic washer 33 on both sides of the rubber element 5. According to the invention, the rubber element 5 can also be joined to the mounting element 3 so that the first and second slide surfaces 18, 19 are disposed between the rubber element 5 and the bearing housing 8 of the coupling element 2.

The invention claimed is:

1. Joint arrangement in a shift mechanism for a motor vehicle, comprising:
   a coupling element cooperating with a gear shift lever;
   a mounting element joinable to a gear lever carrier; and
   a damping element arranged between the coupling element and the mounting element,
   wherein the damping element comprises a rubber element for absorbing vibrations of high amplitude and low frequency by elastic deformation, and a first slide surface contacting a second slide surface on the mounting element, said first and second slide surfaces being arranged to allow horizontal slide movement of the damping element relative to the mounting element so as to prevent vibrations of low amplitude and high frequency from being transferred from the mounting element via the damging element to the coupling element.

2. Joint arrangement according to claim 1, wherein the rubber element is at least partially encapsulated in a cover which comprises said first slide surface.

3. Joint arrangement according to claim 2, wherein the cover consists of first and second sheet metal elements, which at least partially surround the rubber element.

4. Joint arrangement according to claim 1, wherein sheet metal washers connected to the rubber element constitute said first slide surface.

5. Joint arrangement according to claim 1, wherein the rubber element is annular.

6. Joint arrangement according to claim 1, wherein the rubber element is joined to the coupling element, so that the coupling element is displaceable in all directions relative to the mounting element.

7. Joint arrangement according to claim 1, wherein the coupling element is a ball and socket joint, comprising a ball and a bearing housing at least partially surrounding the ball.

8. Joint arrangement according to claim 7, wherein the rubber element is joined to the bearing housing at least partially surrounding the ball.

9. Joint arrangement according to claim 8, wherein the ball is provided with a cavity, which is disposed to receive an end of a shift lever.

10. Joint arrangement according to claim 1, wherein the mounting element is provided with said second slide surface.

11. Joint arrangement according to claim 1, wherein said second slide surface is arranged on plastic washers disposed between the coupling element and the mounting element.

12. Joint arrangement according to claim 1, wherein said first and second slide surfaces are oriented so that the coupling element is slideable in a plane relative to the mounting element.

13. Joint arrangement according to claim 1, wherein the joint arrangement comprises a mechanical stop which limits the relative movement between the coupling element and the mounting element.

14. Joint arrangement according to claim 13, wherein the mechanical stop consists of a cavity in the coupling element and a portion of the mounting element, said portion extending into said cavity.

* * * * *